(12) United States Patent
Zhu et al.

(10) Patent No.: US 12,522,982 B2
(45) Date of Patent: Jan. 13, 2026

(54) PREPARATION METHOD OF ECO-FRIENDLY LONG-LASTING HEAT-SENSITIVE PAPER

(71) Applicant: JIANGXI HESHUOFENG NEW MATERIAL CO., LTD., Jiangxi (CN)

(72) Inventors: Xiaofeng Zhu, Jiangxi (CN); Shengyang Qian, Jiangsu (CN); Xuehuang Yin, Jiangsu (CN)

(73) Assignee: JIANGXI HESHUOFENG NEW MATERIAL CO., LTD., Jiangxi (CN)

( * ) Notice: Subject to any disclaimer, the term of this patent is extended or adjusted under 35 U.S.C. 154(b) by 273 days.

(21) Appl. No.: 18/268,311

(22) PCT Filed: Apr. 26, 2023

(86) PCT No.: PCT/CN2023/090778
§ 371 (c)(1),
(2) Date: Jun. 19, 2023

(87) PCT Pub. No.: WO2024/066328
PCT Pub. Date: Apr. 4, 2024

(65) Prior Publication Data
US 2024/0384473 A1   Nov. 21, 2024

(30) Foreign Application Priority Data

Sep. 28, 2022  (CN) .......................... 202211187980.1

(51) Int. Cl.
*D21H 21/40*   (2006.01)
*B01J 13/18*   (2006.01)
(Continued)

(52) U.S. Cl.
CPC ............ *D21H 21/40* (2013.01); *B01J 13/185* (2013.01); *B01J 13/206* (2013.01); *C09C 1/3054* (2013.01);
(Continued)

(58) Field of Classification Search
None
See application file for complete search history.

(56) References Cited

U.S. PATENT DOCUMENTS

| | | | |
|---|---|---|---|
| 4,431,769 A | 2/1984 | Yoshida et al. | |
| 2011/0251060 A1* | 10/2011 | Harrison | B41M 5/41 503/207 |

FOREIGN PATENT DOCUMENTS

| | | |
|---|---|---|
| CN | 105451746 A | 3/2016 |
| CN | 111074683 A | 4/2020 |

(Continued)

*Primary Examiner* — Samir Shah

(57) ABSTRACT

The present application discloses an eco-friendly long-lasting heat-sensitive paper, including a substrate layer, a base color layer, a heat-sensitive covering layer, and a protective layer that are arranged sequentially from bottom to top, where the heat-sensitive covering layer is prepared as follows: coating a heat-sensitive covering layer raw material on the base color layer, and oven-drying a resulting product, where the heat-sensitive covering layer raw material is an emulsion obtained by mixing an acrylic hollow microsphere with a host resin. In the present application, an acrylic hollow microsphere that can change from an opaque state to a transparent state after rupturing under heat is used as a heat-sensitive covering layer to cover a base color layer to obtain the heat-sensitive paper with heat-sensitive color development characteristics.

9 Claims, 1 Drawing Sheet

(51) Int. Cl.
*B01J 13/20* (2006.01)
*C09C 1/30* (2006.01)
*D21H 19/12* (2006.01)
*D21H 19/40* (2006.01)
*D21H 19/46* (2006.01)
*D21H 19/60* (2006.01)
*D21H 19/62* (2006.01)
*D21H 19/82* (2006.01)
*D21H 21/28* (2006.01)

(52) U.S. Cl.
CPC .......... *C09C 1/3063* (2013.01); *C09C 1/3072* (2013.01); *C09C 1/309* (2013.01); *D21H 19/12* (2013.01); *D21H 19/40* (2013.01); *D21H 19/46* (2013.01); *D21H 19/60* (2013.01); *D21H 19/62* (2013.01); *D21H 19/82* (2013.01); *D21H 21/28* (2013.01)

(56) References Cited

FOREIGN PATENT DOCUMENTS

| | | |
|---|---|---|
| JP | 2002046345 A | 2/2002 |
| JP | 2003253596 A | 9/2003 |

\* cited by examiner

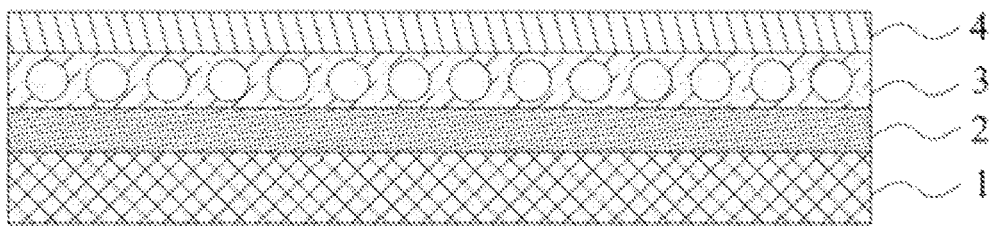

PREPARATION METHOD OF ECO-FRIENDLY LONG-LASTING HEAT-SENSITIVE PAPER

CROSS REFERENCE TO RELATED APPLICATION

The present application claims priority to and rights of patent application Ser. No. 20/221,1187980.1 filed to the China National Intellectual Property Administration (CNIPA) on Sep. 28, 2022, which is incorporated herein by reference in its entirety.

TECHNICAL FIELD

The present application relates to the field of heat-sensitive papers, and in particular relates to an eco-friendly long-lasting heat-sensitive paper.

BACKGROUND

At present, heat-sensitive label films are mainly produced based on a principle that a leuco dye develops a color when exposed to heat, such as an anti-counterfeit heat-sensitive paper and a preparation method thereof disclosed in patent CN201811052465.6 and a water-proof, oil-proof, and polyvinyl chloride (PVC)-proof heat-sensitive paper disclosed in CN202122136200.8. Because a leuco dye can develop a color under an action of a temperature after being mixed with a color-developing agent and a color-developing reaction is a redox reaction, due to long-term storage conditions, a reverse reaction easily occurs in various environments to cause adverse phenomena such as color development of an undeveloped part and color fading of a developed part, which finally leads to a loss of information stored in a material. In order to allow information to be retained for a long time, it is necessary to improve the weather resistance of a material, which requires a complicated formulation technique and coating process, resulting in a high cost.

Before the advent of leuco dyes, the following two heat-sensitive materials are used for color development: metal oxides; and materials that become transparent in a molten state. Metal oxides have basically ceased to develop due to excessive heavy metal residues. The materials that become transparent in a molten state have always been developing, but progress slowly. However, the melting-transparency process is complicated and has high difficulty in construction of a molten layer. Exemplary heat-sensitive papers mostly adopt a paper as a substrate. In melting-transparency heat-sensitive papers, a colored paper is generally adopted as a substrate, an opaque wax is coated as a covering layer on the colored paper, and when heated, the wax melts to become transparent, thereby displaying information. Such a heat-sensitive paper does not have problems such as record retention, and a retention time of the heat-sensitive paper depends entirely on the retention ability of the colored paper, resulting in quite excellent weather resistance. However, these heat-sensitive papers also have congenital deficiencies. For example, because a wax on a surface has a limited strength, a bottom will be exposed after the wax is scratched by a mechanical sharp needle, resulting in poor scratch resistance of a material. In addition, a high color-developing temperature often causes damage to a recording needle of a printer, which affects the wide applications of these heat-sensitive papers.

Patent CN112009129B discloses a plastic substrate-based heat-sensitive paper, including a protective layer, a covering layer, and a color layer. The covering layer is a film layer with a hole structure inside prepared as follows: an inorganic filler masterbatch, a foaming agent masterbatch, or a hollow microcapsule masterbatch is added to polyethylene (PE), and a resulting mixture is stretched. A color-developing principle of the plastic substrate-based heat-sensitive paper is as follows: the hole structure in the covering layer collapses at a specified temperature and pressure, such that the transparency increases to display the color layer. In the above solution, the color development is achieved through a physical change of the covering layer, which can improve a retention time of the heat-sensitive paper. Thus, the above patent provides a preparation solution of a heat-sensitive paper with a specified potential. However, the above solution still has the following shortcomings: (1) In the above solution, an inorganic filler masterbatch, a foaming agent masterbatch, or a hollow microcapsule masterbatch is used to form a hole structure, and a specified temperature and pressure is used to make the hole structure collapse to increase the transparency, thereby achieving color development. However, the controllability of the hole structure is poor, a preparation method of the hole structure is not provided, and it is prone to the following phenomena: the hole structure only deforms without collapsing at a temperature and pressure provided by a heat-sensitive printer, and when the heat-sensitive printer is removed, the hole structure returns to an initial state, such that the covering layer is still opaque or is not transparent enough, which affects the display of the color layer. (2) The protective layer is made of a conventional polyolefin material that usually has poor thermal conduction performance. For example, PE has a thermal conductivity generally of about 0.16 W/(m·K) to 0.24 W/(m·K), polypropylene (PP) has a thermal conductivity generally of about 0.14 W/(m·K) to 0.18 W/(m·K), and PVC has a thermal conductivity generally of about 0.14 W/(m·K) to 0.17 W/(m·K). Therefore, it is easy to cause the following phenomena: because the heat at a head of a heat-sensitive printer cannot be quickly transferred to the covering layer below, a heat-sensitive response of the covering layer to a temperature is not fast enough; and due to poor thermal conduction performance, a contact time between the head of the heat-sensitive printer and the protective layer is prolonged, which reduces the printing efficiency and enhances the adhesion between the head and the protective layer.

Therefore, it is now necessary to improve the existing technique to provide a reliable solution.

SUMMARY

The technical problem to be solved by the present application is to provide an eco-friendly long-lasting heat-sensitive paper in view of the deficiencies in the prior art.

To solve the above technical problem, the present application adopts the following technical solutions: An eco-friendly long-lasting heat-sensitive paper is provided, including a substrate layer, a base color layer, a heat-sensitive covering layer, and a protective layer that are arranged sequentially from bottom to top, where the heat-sensitive covering layer is prepared as follows: coating a heat-sensitive covering layer raw material on the base color layer, and oven-drying a resulting product, where the heat-sensitive covering layer raw material is an emulsion obtained by mixing an acrylic hollow microsphere with a host resin, and a mass ratio of the acrylic hollow microsphere to the host resin in the emulsion is 3:2 to 5:1.

Preferably, the heat-sensitive paper is prepared by the following process:
A. coating a base color layer raw material on a surface of the substrate layer, and oven-drying a resulting product to obtain the base color layer, where the base color layer has a thickness of 2 μm to 3 μm;
B. coating the emulsion obtained by mixing the acrylic hollow microsphere with the host resin on the surface of the base color layer, and oven-drying a resulting product to obtain the heat-sensitive covering layer, where the heat-sensitive covering layer has a thickness of 3 μm to 7 μm; and
C. coating a protective layer raw material on a surface of the heat-sensitive covering layer, and oven-drying a resulting product to obtain the protective layer, where the protective layer has a thickness of 2 μm to 3 μm.

Preferably, the substrate layer is selected from the group consisting of a biaxially oriented polypropylene (BOPP) synthetic paper, a white PE film, a two-sided offset paper, a plastic-coated paper, and a heat-sensitive base paper.

Preferably, the base color layer raw material is a mixture of an acrylic resin and a pigment, and a mass ratio of the acrylic resin to the pigment is 1:0.2 to 1:0.8.

Preferably, the protective layer raw material is a mixture of modified polyurethane (PU), water-washed kaolin, and zinc stearate.

Preferably, the host resin is selected from the group consisting of an acrylic resin, a carboxylated styrene butadiene resin, and a PU resin.

Preferably, the host resin is an acrylic resin, and a mass ratio of the acrylic hollow microsphere to the host resin in the emulsion is 3:1.

Preferably, the heat-sensitive covering layer raw material is prepared by the following process:
S1-1: preparation of the acrylic hollow microsphere:
S1-1-1: in parts by weight, adding 8 to 24 parts of sodium 2-ethylhexyl sulfate, 15 to 40 parts of magnesium nitrate, and 5 to 15 parts of sodium dodecyl sulfate (SDS) to 400 to 600 parts of deionized water to obtain a precursor dispersion, adding 30 to 60 parts of a sodium hydroxide aqueous solution dropwise to the precursor dispersion under continuous stirring, and continuously stirring a resulting mixture for 20 min to 60 min to obtain a dispersion as an aqueous phase;
S1-1-2: in parts by weight, mixing 100 parts of a monomer with a regulating agent A, adding 2 to 8 parts of dibenzoyl peroxide, a regulating agent B, and 40 to 60 parts of a foaming agent, and thoroughly mixing a resulting mixture to obtain an oil phase,
where the monomer is a mixture of methyl methacrylate (MMA), ethyl methacrylate (EMA), methacrylic acid (MAA), an acrylamide, and styrene, and in the monomer, a mass fraction of the EMA is 22% to 34%, a mass fraction of the MAA is 18% to 30%, a mass fraction of the acrylamide is 12% to 24%, a mass fraction of the styrene is 5% to 10%, and the MMA accounts for the balance;
the foaming agent is a mixture of isooctane and n-hexane, and a mass ratio of the isooctane to the n-hexane is 2:1;
the regulating agent A is dipropylene glycol diacrylate (DPGDA); the regulating agent B is one or a mixture of two or more selected from the group consisting of 2,2'-methylene-bis(4,6-di-tert-butylphenyl phosphate) basic aluminum, sodium 2,2'-methylenebis(4,6-di-tert-butylphenyl)phosphate, and bis(4-tert-butyl-benzoate) aluminum hydroxide; and a mass ratio of the regulating agent A to the regulating agent B is 3:2 to 5:1; and S1-1-3: mixing the aqueous phase and the oil phase, stirring a resulting mixed phase at 4,000 rpm to 10,000 rpm to obtain a mixture, and transferring the mixture to a reactor; and subjecting the mixture to a reaction at 8 kPa to 15 kPa and 45° C. to 65° C. for 16 h to 30 h, cooling and filtering a resulting reaction system, and washing and drying a resulting solid product to obtain the acrylic hollow microsphere; and S1-2: preparation of the heat-sensitive covering layer raw material:
with a mass ratio of the acrylic hollow microsphere to the host resin being 3:2 to 5:1, adding the acrylic hollow microsphere to an emulsion of the host resin, and thoroughly stirring a resulting mixture to obtain an emulsion formed by the acrylic hollow microsphere and the host resin, which is the heat-sensitive covering layer raw material.

Preferably, the protective layer raw material is prepared by the following process:
S2-1: preparation of a composite modified particle; and
S2-2: in parts by weight, adding 80 to 100 parts of the PU, 8 to 26 parts of the composite modified particle, 10 to 20 parts of the water-washed kaolin, and 2 to 8 parts of the zinc stearate to a reactor, and heating and blending a resulting mixture to obtain the protective layer raw material, where the blending is conducted for 0.5 h to 2 h at a temperature of 50° C. to 80° C. and a rotational speed of 30 rpm to 100 rpm.

Preferably, the composite modified particle in S2-1 is prepared by the following process:
1) preparation of a carboxylated carbon nanotube (CCNT):
adding a carbon nanotube (CNT) to a mixed acid of concentrated sulfuric acid with a mass fraction of 98% and concentrated nitric acid with a mass fraction of 65%, and subjecting a resulting mixture to ultrasonic dispersion at 75° C. to 110° C. for 2 h to 8 h and then to suction filtration; and washing a resulting solid product until a pH is 7, and drying a washed solid product to obtain the CCNT;
2) preparation of a silica film-coated nano-alumina microsphere $Al_2O_3@SiO_2$:
adding nano-alumina to a mixed solution of ethanol and deionized water, and subjecting a resulting mixture to ultrasonic dispersion; adding ammonia water, and thoroughly stirring a resulting mixture; under continuous stirring, adding a solution of tetraethyl orthosilicate (TEOS) in ethanol dropwise; and centrifuging a resulting system, washing a resulting solid product with deionized water, and drying a washed solid product to obtain $Al_2O_3@SiO_2$,
where the nano-alumina includes a coarse particle and a fine particle, and a mass ratio of the coarse particle to the fine particle is 2:1; and the coarse particle has a diameter of 500 nm to 550 nm and the fine particle has a diameter of 150 nm to 200 nm;
3) preparation of aminated $Al_2O_3@SiO_2$:
adding the $Al_2O_3@SiO_2$ obtained in step 2) to ethanol, and subjecting a resulting mixture to ultrasonic dispersion for 10 min to 40 min; adding aminopropyltriethoxysilane (APTS), and stirring a resulting mixture at 45° C. to 65° C. for 4 h to 10 h; and removing ethanol through evaporation to obtain the aminated $Al_2O_3@SiO_2$, where a mass ratio of the APTS to the $Al_2O_3@SiO_2$ is 4:100 to 15:100;
4) preparation of a modified CNT/nano-alumina microsphere composite $CNT-Al_2O_3@SiO_2$:

adding the CCNT obtained in step 1) and the aminated $Al_2O_3@SiO_2$ obtained in step 3) to deionized water, subjecting a resulting mixture to an ultrasonic treatment for 15 min to 90 min and then to suction filtration, and vacuum-drying a resulting solid product at 70° C. to 90° C. to obtain $CNT-Al_2O_3@SiO_2$, where a mass ratio of the CCNT to the aminated $Al_2O_3@SiO_2$ is 4:1 to 1.5:1; and 5) preparation of the composite modified particle PMMA-$CNT-Al_2O_3@SiO_2$ through in-situ grafting of a polymer on a modified CNT:

adding ammonium persulfate (APS), cetyl trimethyl ammonium bromide (CTAB), and the $CNT-Al_2O_3@SiO_2$ obtained in step 4) to deionized water, adding MMA, thoroughly stirring a resulting mixture, and conducting a reaction at 75° C. to 90° C. for 30 min to 90 min; heating a resulting reaction system to 100° C. to 120° C., and conducting a reaction for 4 h to 12 h; and centrifuging a resulting reaction system, and drying a resulting solid product to obtain the composite modified particle $PMMA-CNT-Al_2O_3@SiO_2$, where a mass ratio of the $CNT-Al_2O_3@SiO_2$ to the MMA is 1:100 to 8:100.

The present application has the following beneficial effects:

In the present application, an acrylic hollow microsphere that can change from an opaque state to a transparent state after rupturing under heat is used as a heat-sensitive covering layer to cover a base color layer to obtain a heat-sensitive paper with heat-sensitive color development characteristics. The heat-sensitive paper has excellent color-developing performance, high printing sensitivity, and excellent weather resistance. Since the heat-sensitive paper is not based on a color-developing reaction principle of a heat-sensitive leuco dye, there are no problems such as color fading, and printing information can be retained for a long time. In addition, because a chemical leuco dye and a reductive color-developing agent are not used, the heat-sensitive paper is eco-friendly and will not cause environmental hazards or the like in subsequent use.

In the present application, a protective layer can be arranged to greatly improve the scratch resistance and protection performance of the heat-sensitive paper, thereby achieving the long-term protection of information. In the present application, since a uniform base color layer is used, the heat-sensitive paper is suitable for applications in special scenarios such as ultra-high-accuracy printing.

In the heat-sensitive covering layer of the present application, the acrylic hollow microsphere undergoes an irreversible rupture after being heated, which can ensure that the heat-sensitive covering layer can change to a transparent state under heat and the underlying base color layer is revealed. In addition, a ratio of the regulating agent A to the regulating agent B can be adjusted to adjust the toughness and strength of a shell of the acrylic hollow microsphere, such that the shell can be well adapted to expansion characteristics of the heat-sensitive paper of the present application. When the heat-sensitive paper is normally stored, a sphere structure of the acrylic hollow microsphere has excellent stability, can prevent the foaming agent from overflowing, and can resist an action of an external force or an external temperature environment to some extent. When heated by a heat-sensitive printer, the acrylic hollow microsphere can quickly expand and rupture.

In some embodiments of the present application, a composite modified particle is used for blend-modification on PU to obtain a protective layer, which can significantly improve the thermal conduction performance and scratch resistance of the protective layer and retain excellent transparency. Therefore, the protective layer can provide excellent protection for the heat-sensitive covering layer below, improve the color-developing efficiency of heat-sensitive printing, and reduce a contact time between a head of a heat-sensitive printer and the protective layer, thereby further avoiding the adhesion between the printer head and the protective layer.

BRIEF DESCRIPTION OF THE DRAWING

To describe the technical solutions in the embodiments of the present application or in the prior art clearly, the accompanying drawings required for describing the embodiments or the prior art will be briefly described below. Apparently, the accompanying drawings in the following description only show some embodiments of the present application, and a person of ordinary skill in the art may still derive other drawings according to structures illustrated in these accompanying drawings without creative efforts.

The FIGURE is a schematic structural diagram of the eco-friendly long-lasting heat-sensitive paper of the present application.

REFERENCE NUMERALS

1: substrate layer; 2: base color layer; 3: heat-sensitive covering layer; and 4: protective layer.

DETAILED DESCRIPTION OF THE EMBODIMENTS

The present application will be further described in detail below with reference to embodiments, such that those skilled in the art can implement the present application with reference to the description.

It should be understood that the terms, such as "have", "include", and "comprise" used herein, do not exclude the presence or addition of one or more other elements or a combination thereof.

Unless otherwise specified, the experimental methods used in the following embodiments are conventional methods. Unless otherwise specified, all materials, reagents, or the like used in the following embodiments may be commercially available. If no specific conditions are specified in the embodiments, the embodiments will be implemented under conventional conditions or conditions recommended by a manufacturer. All of the used reagents or instruments which are not specified with manufacturers are conventional commercially-available products.

As shown in the FIGURE, the present application provides an eco-friendly long-lasting heat-sensitive paper, including a substrate layer 1, a base color layer 2, a heat-sensitive covering layer 3, and a protective layer 4 that are arranged sequentially from bottom to top, where the heat-sensitive covering layer is prepared as follows: coating a heat-sensitive covering layer raw material on the base color layer, and oven-drying a resulting product, where the heat-sensitive covering layer raw material is an emulsion obtained by mixing an acrylic hollow microsphere with a host resin, and a mass ratio of the acrylic hollow microsphere to the host resin in the emulsion is 3:2 to 5:1.

The acrylic hollow microsphere in the heat-sensitive covering layer can irreversibly rupture when heated by a heat-sensitive printer, such that the heat-sensitive covering layer changes from an opaque state to a transparent state and the underlying base color layer is revealed, thereby exhibiting a heat-sensitive characteristic. A covering principle of the acrylic hollow microsphere is as follows: when incident light irradiates a surface of the acrylic hollow microsphere, due to the hollow structure, a polymer of an outer shell and an inside of a cavity show different refractive indexes for the light, such that the incident light can be effectively scattered, and the acrylic hollow microsphere is in an opaque state and can well cover the underlying base color layer. When the acrylic hollow microsphere ruptures under heat, the hollow structure is destroyed, the light scattering performance is lost, and the heat-sensitive covering layer changes to a transparent state and no longer provides a covering effect.

The heat-sensitive paper is prepared by the following process:

A. a base color layer raw material is coated on a surface of the substrate layer, and a resulting product is oven-dried to obtain the base color layer, where the base color layer has a thickness of 2 μm to 3 μm;

B. the emulsion obtained by mixing the acrylic hollow microsphere with the host resin is coated on the surface of the base color layer, and a resulting product is oven-dried to obtain the heat-sensitive covering layer, where the heat-sensitive covering layer has a thickness of 3 μm to 7 μm; and C. a protective layer raw material is coated on a surface of the heat-sensitive covering layer, and a resulting product is oven-dried to obtain the protective layer, where the protective layer has a thickness of 2 μm to 3 μm.

The coating in the above step can refer to reverse coating with an anilox roller or coating with a wire rod.

The prepared heat-sensitive paper can be directly used as a substrate for a label sticker, or solvent-free silicone oil can be coated on the protective layer to obtain a liner-free heat-sensitive paper for application.

In a preferred embodiment, the substrate layer is selected from the group consisting of a BOPP synthetic paper, a white PE film, a two-sided offset paper, a plastic-coated paper, and a heat-sensitive base paper, but is not limited thereto. More preferably, the substrate layer is a 40 g BOPP synthetic paper, a 40 g two-sided offset paper, or the like.

In a preferred embodiment, the base color layer raw material is a mixture of an acrylic resin and a pigment; and a mass ratio of the acrylic resin to the pigment is 1:0.2 to 1:0.8, and further preferably, the mass ratio of the acrylic resin to the pigment is 1:0.4. The pigment can be a black pigment or a pigment of another color. For example, when the black pigment is adopted, the heat-sensitive paper itself appears white and becomes black during printing by a heat-sensitive printer.

In a preferred embodiment, the host resin is selected from the group consisting of an acrylic resin, a carboxylated styrene butadiene resin, and a PU resin. In a further preferred embodiment, the host resin is an acrylic resin, and a mass ratio of the acrylic hollow microsphere to the host resin in the emulsion is 3:1. The acrylic resin emulsion and the acrylic hollow microsphere can be thoroughly mixed according to the weight ratio to obtain the heat-sensitive covering layer raw material.

In a preferred embodiment, the protective layer raw material is a mixture of PU, water-washed kaolin, and zinc stearate. The protective layer raw material has excellent scratch resistance and thus can protect the underlying covering layer from being scratched; and the protective layer has excellent transparency and will not affect the reveal of the base color layer.

In a further preferred embodiment, the protective layer raw material further includes a composite modified particle, and thus can further improve the scratch resistance and thermal conduction performance of the protective layer, ensure that the underlying heat-sensitive covering layer can respond quickly to a temperature to change from an opaque state to a transparent state during heat-sensitive printing, and ensure that the protective layer will not be adhered to a print head during color development through heat-sensitive printing, which will be detailed below.

In a preferred embodiment, the heat-sensitive covering layer raw material is prepared by the following process:

S1-1: Preparation of the acrylic hollow microsphere:

S1-1-1: In parts by weight, 8 to 24 parts of sodium 2-ethylhexyl sulfate, 15 to 40 parts of magnesium nitrate, and 5 to 15 parts of SDS are added to 400 to 600 parts of deionized water to obtain a precursor dispersion, 30 to 60 parts of a sodium hydroxide aqueous solution are added dropwise to the precursor dispersion under continuous stirring, and a resulting mixture is continuously stirred for 20 min to 60 min to obtain a dispersion as an aqueous phase.

The generated magnesium hydroxide particles can be effectively adsorbed as a dispersing agent on surfaces of monomer droplets to stabilize the monomer droplets, thereby facilitating the dispersion of monomer droplets; and the SDS can effectively stabilize the magnesium hydroxide particles to avoid agglomeration of the magnesium hydroxide particles.

S1-1-2: In parts by weight, 100 parts of a monomer are mixed with a regulating agent A, then 2 to 8 parts of dibenzoyl peroxide, a regulating agent B, and 40 to 60 parts of a foaming agent are added, and a resulting mixture is thoroughly mixed to obtain an oil phase, where the monomer is a mixture of MMA, EMA, MAA, an acrylamide, and styrene, and in the monomer, a mass fraction of the EMA is 22% to 34%, a mass fraction of the MAA is 18% to 30%, a mass fraction of the acrylamide is 12% to 24%, a mass fraction of the styrene is 5% to 10%, and the MMA accounts for the balance;

the foaming agent is a mixture of isooctane and n-hexane, and a mass ratio of the isooctane to the n-hexane is 2:1;

the regulating agent A is DPGDA; the regulating agent B is one or a mixture of two or more selected from the group consisting of 2,2'-methylene-bis(4,6-di-tert-butylphenyl phosphate)basic aluminum, sodium 2,2'-methylenebis(4,6-di-tert-butylphenyl)phosphate, and bis(4-tert-butyl-benzoate)aluminum hydroxide; and a mass ratio of the regulating agent A to the regulating agent B is 3:2 to 5:1.

S1-1-3: The aqueous phase and the oil phase are mixed and stirred at a high rotational speed of 4,000 rpm to 10,000 rpm to obtain a mixture, the mixture is transferred to a reactor, subjected to a reaction at 8 kPa to 15 kPa and 45° C. to 65° C. for 16 h to 30 h, cooled, and filtered, and a resulting solid product is washed and dried to obtain the acrylic hollow microsphere.

S1-2: Preparation of the heat-sensitive covering layer raw material:

With a mass ratio of the acrylic hollow microsphere to the host resin being 3:2 to 5:1, the acrylic hollow microsphere is added to an emulsion of the host resin, and a resulting mixture is thoroughly stirred to obtain an emulsion formed by the acrylic hollow microsphere and the host resin, which is the heat-sensitive covering layer raw material.

The acrylic hollow microsphere in the present application is a foamed microsphere with an acrylic resin as a shell and a mixture of isooctane and n-hexane as a foaming agent wrapped by the shell; and when heated, the foaming agent with a low boiling point expands, such that the foamed microsphere can rapidly rupture. In an exemplary acrylic hollow microsphere, because an acrylic resin shell has excellent toughness and a high thermal expansion rate (that is, the acrylic resin shell is not easy to rupture after thermal expansion), such that, when the exemplary acrylic hollow microsphere is used in the present application, the high thermal expansion rate will make the acrylic hollow microsphere fail to smoothly and rapidly rupture under heating by a heat-sensitive printer (that is, the heat-sensitive response sensitivity is low) and thus the underlying base color layer cannot be smoothly and rapidly revealed. In the present application, a ratio of the regulating agent A to the regulating agent B can be adjusted to adjust the toughness and strength of a shell of the acrylic hollow microsphere, such that the shell can be well adapted to expansion characteristics of the heat-sensitive paper of the present application. When expanding to an appropriate volume, the acrylic hollow microsphere can rapidly rupture. In addition, it can ensure that the acrylic hollow microsphere has a specified strength, and thus can maintain excellent stability when a rupture is not required. A specific principle is explained below.

The regulating agent A is DPGDA, which can promote the crosslinking of the resin and enhance the toughness of the shell of the acrylic hollow microsphere. The regulating agent B is one or a mixture of two or more selected from the group consisting of 2,2'-methylene-bis(4,6-di-tert-butylphenyl phosphate)basic aluminum, sodium 2,2'-methylenebis(4,6-di-tert-butylphenyl)phosphate, and bis(4-tert-butyl-benzoate)aluminum hydroxide, which can promote the crystallization. With the increase of crystallinity, the molecular chains are arranged tightly and orderly, the porosity is reduced, the intermolecular interaction is increased, and the chain segment motion becomes difficult, which improves the strength and brittleness of the polymer and reduces the toughness of the polymer. Thus, the ratio of the regulating agent A to the regulating agent B is controlled to make the shell of the acrylic hollow microsphere have an appropriate toughness and strength. When the heat-sensitive paper is normally stored, a sphere structure of the acrylic hollow microsphere has excellent stability, can prevent the foaming agent from overflowing, and can resist an action of an external force or an external temperature environment to some extent. When heated by a heat-sensitive printer, the acrylic hollow microsphere can quickly rupture. In a preferred embodiment, the mass ratio of the regulating agent A to the regulating agent B is 3:2 to 5:1; and in a further preferred embodiment, the mass ratio of the regulating agent A to the regulating agent B is 2:1 to 3:1, such that the prepared acrylic hollow microsphere has a maximum thermal expansion rate of 1.4 to 2 at about 200° C. (that is, when an expansion rate exceeds this value, the acrylic hollow microsphere begins to rupture), and thus can rapidly respond to a temperature elevation to rupture. An exemplary acrylic foamed microsphere usually pursues a high expansion rate, and it is expected to maximize the toughness of a shell of the microsphere as much as possible. In the present application, the above technical bias is abandoned, such that an acrylic hollow microsphere suitable for the heat-sensitive paper of the present application is obtained.

In a preferred embodiment, the protective layer raw material is prepared by the following process:

S2-1: Preparation of a composite modified particle:

1) Preparation of a CCNT:

A CNT is added to a mixed acid of concentrated sulfuric acid with a mass fraction of 98% and concentrated nitric acid with a mass fraction of 65%, and a resulting mixture is subjected to ultrasonic dispersion at 75° C. to 110° C. for 2 h to 8 h and then to suction filtration; and a resulting solid product is washed until a pH is 7 and then dried to obtain the CCNT.

2) Preparation of a Silica Film-Coated Nano-Alumina Microsphere $Al_2O_3@SiO_2$:

Nano-alumina is added to a mixed solution of ethanol and deionized water, and a resulting mixture is subjected to ultrasonic dispersion; ammonia water is added, and a resulting mixture is thoroughly stirred; under continuous stirring, a solution of TEOS in ethanol is added dropwise; and a resulting system is centrifuged, and a resulting solid product is washed with deionized water and then dried to obtain $Al_2O_3@SiO_2$, where the nano-alumina includes a coarse particle and a fine particle, and a mass ratio of the coarse particle to the fine particle is 2:1; and the coarse particle has a diameter of 500 nm to 550 nm and the fine particle has a diameter of 150 nm to 200 nm.

3) Preparation of Aminated $Al_2O_3@SiO_2$:

The $Al_2O_3@SiO_2$ obtained in step 2) is added to ethanol, and a resulting mixture is subjected to ultrasonic dispersion for 10 min to 40 min; APTS is added, and a resulting mixture is stirred at 45° C. to 65° C. for 4 h to 10 h; and ethanol is removed through evaporation to obtain the aminated $Al_2O_3@SiO_2$, where a mass ratio of the APTS to the $Al_2O_3@SiO_2$ is 4:100 to 15:100.

4) Preparation of a Modified CNT/Nano-Alumina Microsphere Composite CNT-$Al_2O_3@SiO_2$:

The CCNT obtained in step 1) and the aminated $Al_2O_3@SiO_2$ obtained in step 3) are added to deionized water, a resulting mixture is subjected to an ultrasonic treatment for 15 min to 90 min and then to suction filtration, and a resulting solid product is vacuum-dried at 70° C. to 90° C. to obtain CNT-$Al_2O_3@SiO_2$, where a mass ratio of the CCNT to the aminated $Al_2O_3@SiO_2$ is 4:1 to 1.5:1.

5) Preparation of the Composite Modified Particle PMMA-CNT-$Al_2O_3@SiO_2$ Through In-Situ Grafting of a Polymer on a Modified CNT:

APS, CTAB, and the CNT-$Al_2O_3@SiO_2$ obtained in step 4) are added to deionized water, MMA is added, and a resulting mixture is thoroughly stirred, subjected to a reaction at 75° C. to 90° C. for 30 min to 90 min, heated to 100° C. to 120° C., and subjected to a reaction for 4 h to 12 h; and a resulting reaction system is centrifuged, and a resulting solid product is dried to obtain the composite modified particle PMMA-CNT-$Al_2O_3@SiO_2$, where a mass ratio of the CNT-$Al_2O_3@SiO_2$ to the MMA is 1:100 to 8:100.

S2-2: In parts by weight, 80 to 100 parts of the PU, 8 to 26 parts of the composite modified particle, 10 to 20 parts of the water-washed kaolin, and 2 to 8 parts of the zinc stearate are added to a reactor, and heated and blended to obtain the protective layer raw material, where the blending is conducted for 0.5 h to 2 h at a temperature of 50° C. to 80° C. and a rotational speed of 30 rpm to 100 rpm.

The protective layer in the present application mainly plays a protective role, and is provided to protect the heat-sensitive covering layer and prevent a head of a heat-sensitive printer from directly contacting the heat-sensitive covering layer to cause adhesion. Therefore, the protective layer not only needs to have excellent scratch resistance and prominent transparency, but also should have excellent thermal conduction performance, such that the heat at a head of a heat-sensitive printer can be quickly transferred to the heat-sensitive covering layer to quickly trigger the heat-sensitive color-developing effect, which can improve the color-developing efficiency during heat-sensitive printing, and can also further avoid the adhesion between the head of the heat-sensitive printer and the protective layer due to the reduced contact time between the head of the heat-sensitive printer and the protective layer. PU has excellent transparency and specified scratch resistance, and thus can be used to prepare the protective layer. However, the conventional PU generally exhibits poor thermal conduction performance, and has a thermal conductivity generally of 0.16 W/(m·K) to 0.22 W/(m·K), such that, when the resin is used in preparation of the protective layer, there will be the defect of poor thermal conduction performance. In the above preferred embodiment of the present application, the composite modified particle is used for blend-modification on PU to significantly improve the thermal conductivity, such that the heat at a head of a printer can quickly and fully act on the heat-sensitive covering layer, which improves the color-developing sensitivity of the heat-sensitive paper. In a preferred embodiment, the thermal conductivity can reach 2.5 W/(m·K) to 3.4 W/(m·K). In addition, the scratch resistance and weather resistance can be further improved without affecting the transparency of the protective layer.

A main mechanism of the composite modified particle is described below to facilitate the comprehension of the present application.

The composite modified particle in the present application is constructed with nano-alumina and a CNT as main heat-conduction matrices. The nano-alumina has a high thermal conductivity and can significantly improve the scratch resistance and strength of the protective layer; and the CNT has a structure with a large aspect ratio, and exhibits both excellent mechanical performance and excellent thermal conduction performance, which can improve both the strength and the thermal conduction performance of the material. In addition, either the nano-alumina or the CNT does not affect the transparency, and thus is a thermal conduction-enhancing modification material with high potential. The more uniform the dispersion of the nano-alumina and CNT in the material, the better the improvement effect. However, because the two materials have defects such as easy agglomeration and difficult dispersion due to their nanostructure characteristics and show poor compatibility with the organic system, when used directly, the two materials are difficult to be fully dispersed into the PU system to play their roles, but are prone to serious agglomeration, thereby negatively affecting the performance of the PU system. In the present application, the structural system of the composite modified particle can be constructed to solve this problem, which is specifically as follows:

1. In the present application, silica is first coated on a nano-alumina microsphere to obtain $Al_2O_3@SiO_2$. Hydroxyl on a surface of $SiO_2$ has excellent compatibility with the PU matrix; and the coating of $SiO_2$ can enhance an interaction between interfaces while reducing the heat resistance of the polymer to enhance the thermal conduction efficiency, and can also improve the stability of the nano-alumina microsphere. Then a large number of amino functional groups are introduced on the silica coating film through amination.

2. Then a CCNT is blended with the $Al_2O_3@SiO_2$ to allow a reaction, where hydroxyl on the surface of $SiO_2$ and carboxyl on the surface of $SiO_2$ can be bonded through a hydrogen bond, and the carboxyl is bonded with amino on the surface of $SiO_2$ through an electrostatic interaction, such that the $Al_2O_3@SiO_2$ particle can be firmly grafted to the CNT to obtain a CNT-$Al_2O_3@SiO_2$ composite.

3. Through in-situ polymerization, a polymethylmethacrylate (PMMA) copolymer is grafted on the CNT-$Al_2O_3@SiO_2$ composite to finally obtain a composite modified particle PMMA-CNT-$Al_2O_3@SiO_2$. During the polymerization, oxygen-containing functional groups such as carboxyl can participate in a polymerization reaction of MMA, such that a polymer is uniformly grafted on a surface of the CNT. The polymer grafted on the surface can greatly improve the dispersion of the composite modified particle PMMA-CNT-$Al_2O_3@SiO_2$ in the PU organic system, and can synergize with the hydroxyl on the silica coating layer such that the composite modified particle PMMA-CNT-$Al_2O_3@SiO_2$ can be uniformly and fully dispersed in the PU system and can give full play to its effect of enhancing thermal conductivity and scratch resistance.

The CNT can form an interwoven heat-conduction network structure in the PU system, and the $Al_2O_3@SiO_2$ particle forms a center of the network, which can further improve the thermal conduction performance and strength of the heat-conduction network structure, and comprehensively improve the thermal conduction performance and scratch resistance of the PU system.

The nano-alumina microsphere is a mixed microsphere of a coarse particle (500 nm to 550 nm) and a fine particle (150 nm to 200 nm) in a mass ratio of 2:1, rather than a microsphere of a uniform particle size, which is mainly attributed to the following reason: nano-alumina microspheres of different particle sizes can lead to excellent thermal conduction efficiency, where coarse-grained alumina microspheres can quickly form a heat-conduction network; and fine-grained alumina microspheres can easily lead to a large number of heat-conduction channels, such that the combination of the coarse and fine particles can reduce gaps among alumina microspheres and improve the thermal conduction efficiency.

The above is an overall idea of the present application, and on this basis, detailed examples are provided below to further explain the present application.

Example 1

An eco-friendly long-lasting heat-sensitive paper was provided, including a substrate layer, a base color layer, a heat-sensitive covering layer, and a protective layer that were arranged sequentially from bottom to top.

The heat-sensitive paper was prepared by the following process:

A. A base color layer raw material was coated on a surface of the substrate layer, and a resulting product was oven-dried to obtain the base color layer, where the base color layer had a thickness of 2 μm to 3 μm; and the base color layer raw material was a mixture of an acrylic resin and a black pigment, and a mass ratio of the acrylic resin to the black pigment was 1:0.4.

B. A heat-sensitive covering layer raw material was coated on a surface of the base color layer, and a resulting product was oven-dried to obtain the heat-sensitive covering layer, where the heat-sensitive covering layer had a thickness of 3 μm to 7 μm; and the heat-sensitive covering layer raw material was an emulsion obtained by mixing an acrylic hollow microsphere with an acrylic resin, and a mass ratio of the acrylic hollow microsphere to the acrylic resin in the emulsion was 3:1.

C. A protective layer raw material was coated on a surface of the heat-sensitive covering layer, and a resulting product was oven-dried to obtain the protective layer, where the protective layer had a thickness of 2 μm to 3 μm; and the protective layer raw material was a mixture of PU, water-washed kaolin, and zinc stearate.

The coating in the above steps referred to reverse coating with an anilox roller; and the substrate layer was a 40 g BOPP synthetic paper.

In this example, the heat-sensitive covering layer raw material was prepared by the following process:

S1-1: Preparation of the acrylic hollow microsphere:

S1-1-1: In parts by weight, 16 parts of sodium 2-ethylhexyl sulfate, 24 parts of magnesium nitrate, and 10 parts of SDS were added to 500 parts of deionized water to obtain a precursor dispersion, 50 parts of a sodium hydroxide aqueous solution were added dropwise to the precursor dispersion under continuous stirring, and a resulting mixture was continuously stirred for 30 min to obtain a dispersion as an aqueous phase.

The generated magnesium hydroxide particles could be effectively adsorbed as a dispersing agent on surfaces of monomer droplets to stabilize the monomer droplets, thereby facilitating the dispersion of monomer droplets; and the SDS could effectively stabilize the magnesium hydroxide particles to avoid agglomeration of the magnesium hydroxide particles.

S1-1-2: In parts by weight, 100 parts of a monomer were mixed with 6 parts of a regulating agent A, then 4 parts of dibenzoyl peroxide, 2 parts of a regulating agent B, and 48 parts of a foaming agent were added, and a resulting mixture was thoroughly mixed to obtain an oil phase, where the monomer was a mixture of MMA, EMA, MAA, an acrylamide, and styrene, and in the monomer, a mass fraction of the EMA was 24%, a mass fraction of the MAA was 19%, a mass fraction of the acrylamide was 15%, a mass fraction of the styrene was 7%, and the MMA accounted for the balance;

the foaming agent was a mixture of isooctane and n-hexane, and a mass ratio of the isooctane to the n-hexane was 2:1;

the regulating agent A was DPGDA; and the regulating agent B was 2,2'-methylene-bis(4,6-di-tert-butylphenyl phosphate)basic aluminum.

S1-1-3: The aqueous phase and the oil phase were mixed and stirred at a high rotational speed of 8,000 rpm to obtain a mixture, the mixture was transferred to a reactor, subjected to a reaction at 10 kPa and 50° C. for 20 h, cooled, and filtered, and a resulting solid product was washed and dried to obtain the acrylic hollow microsphere.

S1-2: Preparation of the heat-sensitive covering layer raw material:

With a mass ratio of the acrylic hollow microsphere to an acrylic resin being 3:1, the acrylic hollow microsphere was added to an emulsion of the acrylic resin, and a resulting mixture was thoroughly stirred to obtain an emulsion formed by the acrylic hollow microsphere and the host resin, which was the heat-sensitive covering layer raw material.

In this example, the protective layer raw material was prepared by the following process:

S2-2: In parts by weight, 90 parts of PU, 14 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm.

Example 2

An eco-friendly long-lasting heat-sensitive paper was provided, including a substrate layer, a base color layer, a heat-sensitive covering layer, and a protective layer that were arranged sequentially from bottom to top.

The heat-sensitive paper was prepared by the following process:

A. A base color layer raw material was coated on a surface of the substrate layer, and a resulting product was oven-dried to obtain the base color layer, where the base color layer had a thickness of 2 μm to 3 μm; and the base color layer raw material was a mixture of an acrylic resin and a black pigment, and a mass ratio of the acrylic resin to the black pigment was 1:0.4.

B. A heat-sensitive covering layer raw material was coated on a surface of the base color layer, and a resulting product was oven-dried to obtain the heat-sensitive covering layer, where the heat-sensitive covering layer had a thickness of 3 μm to 7 μm; and the heat-sensitive covering layer raw material was an emulsion obtained by mixing an acrylic hollow microsphere with an acrylic resin, and a mass ratio of the acrylic hollow microsphere to the acrylic resin in the emulsion was 3:1.

C. A protective layer raw material was coated on a surface of the heat-sensitive covering layer, and a resulting product was oven-dried to obtain the protective layer, where the protective layer had a thickness of 2 μm to 3 μm; and the protective layer raw material was a mixture of PU, water-washed kaolin, and zinc stearate.

The coating in the above steps referred to reverse coating with an anilox roller; and the substrate layer was a 40 g BOPP synthetic paper.

In this example, the heat-sensitive covering layer raw material was prepared by the following process:

S1-1: Preparation of the acrylic hollow microsphere:

S1-1-1: In parts by weight, 16 parts of sodium 2-ethylhexyl sulfate, 24 parts of magnesium nitrate, and 10 parts of SDS were added to 500 parts of deionized water to obtain a precursor dispersion, 50 parts of a sodium hydroxide aqueous solution were added dropwise to the precursor dispersion under continuous stirring, and a resulting mixture was continuously stirred for 30 min to obtain a dispersion as an aqueous phase.

The generated magnesium hydroxide particles could be effectively adsorbed as a dispersing agent on surfaces of monomer droplets to stabilize the monomer droplets, thereby facilitating the dispersion of monomer droplets; and the SDS could effectively stabilize the magnesium hydroxide particles to avoid agglomeration of the magnesium hydroxide particles.

S1-1-2: In parts by weight, 100 parts of a monomer were mixed with 6 parts of a regulating agent A, then 4 parts of dibenzoyl peroxide, 2 parts of a regulating agent B, and 48 parts of a foaming agent were added, and a resulting mixture was thoroughly mixed to obtain an oil phase, where the monomer was a mixture of MMA, EMA, MAA, an acrylamide, and styrene, and in the monomer, a mass fraction of the EMA was 24%, a mass fraction of the MAA was 19%, a mass fraction of the acrylamide was 15%, a mass fraction of the styrene was 7%, and the MMA accounted for the balance;

the foaming agent was a mixture of isooctane and n-hexane, and a mass ratio of the isooctane to the n-hexane was 2:1;

the regulating agent A was DPGDA; and the regulating agent B was 2,2'-methylene-bis(4,6-di-tert-butylphenyl phosphate)basic aluminum.

S1-1-3: The aqueous phase and the oil phase were mixed and stirred at a high rotational speed of 8,000 rpm to obtain a mixture, the mixture was transferred to a reactor, subjected to a reaction at 10 kPa and 50° C. for 20 h, cooled, and filtered, and a resulting solid product was washed and dried to obtain the acrylic hollow microsphere.

S1-2: Preparation of the heat-sensitive covering layer raw material:

With a mass ratio of the acrylic hollow microsphere to an acrylic resin being 3:1, the acrylic hollow microsphere was added to an emulsion of the acrylic resin, and a resulting mixture was thoroughly stirred to obtain an emulsion formed by the acrylic hollow microsphere and the host resin, which was the heat-sensitive covering layer raw material.

In this example, the protective layer raw material was prepared by the following process:

S2-1: Preparation of a composite modified particle:

1) Preparation of a CCNT:
   1 g of a multi-walled carbon nanotube (MWCNT) (diameter: 30 nm to 50 nm, commercially available) was added to 200 mL of a mixed acid (including concentrated sulfuric acid with a mass fraction of 98% and concentrated nitric acid with a mass fraction of 65% that were in a volume ratio of 3:1), and a resulting mixture was subjected to ultrasonic dispersion at 80° C. for 6 h and then to suction filtration; and a resulting solid product was washed until a pH was 7 and then dried to obtain the CCNT.

2) Preparation of a Silica Film-Coated Nano-Alumina Microsphere $Al_2O_3@SiO_2$:
   1 g of nano-alumina ($\alpha$-$Al_2O_3$, commercially available) was added to 300 mL of a mixed solution of ethanol and deionized water (which were in a volume ratio of 1:1), and a resulting mixture was subjected to ultrasonic dispersion for 30 min; 70 mL of 2 mol/L ammonia water was added, and a resulting mixture was thoroughly stirred; under continuous stirring, a solution of TEOS in ethanol (including 12 mL of TEOS and 70 mL of ethanol) was added dropwise; and a resulting system was centrifuged, and a resulting solid product was washed with deionized water and then dried to obtain $Al_2O_3@SiO_2$,
   where the nano-alumina included a coarse particle and a fine particle, and a mass ratio of the coarse particle to the fine particle was 2:1; and the coarse particle had a diameter of 500 nm to 550 nm and the fine particle had a diameter of 150 nm to 200 nm.

3) Preparation of Aminated $Al_2O_3@SiO_2$:
   The $Al_2O_3@SiO_2$ obtained in step 2) was added to 100 mL of ethanol, and a resulting mixture was subjected to ultrasonic dispersion for 20 min; APTS was added, and a resulting mixture was stirred at 55° C. for 8 h; and ethanol was removed through evaporation to obtain the aminated $Al_2O_3@SiO_2$, where a mass ratio of the APTS to the $Al_2O_3@SiO_2$ was 8:100.

4) Preparation of a Modified CNT/Nano-Alumina Microsphere Composite CNT-$Al_2O_3@SiO_2$:
   0.5 g of the CCNT obtained in step 1) and 0.25 g of the aminated $Al_2O_3@SiO_2$ obtained in step 3) were added to 100 mL of deionized water, a resulting mixture was subjected to an ultrasonic treatment for 45 min and then to suction filtration, and a resulting solid product was vacuum-dried at 80° C. to obtain CNT-$Al_2O_3@SiO_2$.

5) Preparation of the Composite Modified Particle PMMA-CNT-$Al_2O_3@SiO_2$ Through In-Situ Grafting of a Polymer on a Modified CNT:
   0.2 g of APS, 0.4 g of CTAB, and 0.8 g of the CNT-$Al_2O_3@SiO_2$ obtained in step 4) were added to 50 mL of deionized water, then 20 g of MMA was added, and a resulting mixture was thoroughly stirred, subjected to a reaction at 75° C. to 90° C. for 30 min to 90 min, heated to 100° C. to 120° C., and subjected to a reaction for 4 h to 12 h; and a resulting reaction system was centrifuged, and a resulting solid product was dried to obtain the composite modified particle PMMA-CNT-$Al_2O_3@SiO_2$.

S2-2: In parts by weight, 90 parts of PU, 14 parts of the composite modified particle, 12 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm.

Example 3

An eco-friendly long-lasting heat-sensitive paper was provided, including a substrate layer, a base color layer, a heat-sensitive covering layer, and a protective layer that were arranged sequentially from bottom to top.

The heat-sensitive paper was prepared by the following process:

A. A base color layer raw material was coated on a surface of the substrate layer, and a resulting product was oven-dried to obtain the base color layer, where the base color layer had a thickness of 2 μm to 3 μm; and the base color layer raw material was a mixture of an acrylic resin and a black pigment, and a mass ratio of the acrylic resin to the black pigment was 1:0.4.

B. A heat-sensitive covering layer raw material was coated on a surface of the base color layer, and a resulting product was oven-dried to obtain the heat-sensitive covering layer, where the heat-sensitive covering layer had a thickness of 3 μm to 7 μm; and the heat-sensitive covering layer raw material was an emulsion obtained by mixing an acrylic hollow microsphere with an acrylic resin, and a mass ratio of the acrylic hollow microsphere to the acrylic resin in the emulsion was 3:1.

C. A protective layer raw material was coated on a surface of the heat-sensitive covering layer, and a resulting product was oven-dried to obtain the protective layer, where the protective layer had a thickness of 2 μm to 3 μm; and the protective layer raw material was a mixture of PU, water-washed kaolin, and zinc stearate.

The coating in the above steps referred to reverse coating with an anilox roller; and the substrate layer was a heat-sensitive base paper.

In this example, the heat-sensitive covering layer raw material was prepared by the following process:

S1-1: Preparation of the acrylic hollow microsphere:
- S1-1-1: In parts by weight, 16 parts of sodium 2-ethylhexyl sulfate, 24 parts of magnesium nitrate, and 10 parts of SDS were added to 500 parts of deionized water to obtain a precursor dispersion, 50 parts of a sodium hydroxide aqueous solution were added dropwise to the precursor dispersion under continuous stirring, and a resulting mixture was continuously stirred for 30 min to obtain a dispersion as an aqueous phase.

The generated magnesium hydroxide particles could be effectively adsorbed as a dispersing agent on surfaces of monomer droplets to stabilize the monomer droplets, thereby facilitating the dispersion of monomer droplets; and the SDS could effectively stabilize the magnesium hydroxide particles to avoid agglomeration of the magnesium hydroxide particles.

- S1-1-2: In parts by weight, 100 parts of a monomer were mixed with 6 parts of a regulating agent A, then 4 parts of dibenzoyl peroxide, 3 parts of a regulating agent B, and 48 parts of a foaming agent were added, and a resulting mixture was thoroughly mixed to obtain an oil phase,
  where the monomer was a mixture of MMA, EMA, MAA, an acrylamide, and styrene, and in the monomer, a mass fraction of the EMA was 24%, a mass fraction of the MAA was 19%, a mass fraction of the acrylamide was 15%, a mass fraction of the styrene was 7%, and the MMA accounted for the balance;
  the foaming agent was a mixture of isooctane and n-hexane, and a mass ratio of the isooctane to the n-hexane was 2:1;
  the regulating agent A was DPGDA; and the regulating agent B was 2,2'-methylene-bis(4,6-di-tert-butylphenyl phosphate)basic aluminum.
- S1-1-3: The aqueous phase and the oil phase were mixed and stirred at a high rotational speed of 8,000 rpm to obtain a mixture, the mixture was transferred to a reactor, subjected to a reaction at 10 kPa and 50° C. for 20 h, cooled, and filtered, and a resulting solid product was washed and dried to obtain the acrylic hollow microsphere.

S1-2: Preparation of the heat-sensitive covering layer raw material:

With a mass ratio of the acrylic hollow microsphere to an acrylic resin being 3:1, the acrylic hollow microsphere was added to an emulsion of the acrylic resin, and a resulting mixture was thoroughly stirred to obtain an emulsion formed by the acrylic hollow microsphere and the host resin, which was the heat-sensitive covering layer raw material.

In this example, the protective layer raw material was prepared by the following process:

S2-1: Preparation of a composite modified particle:

1) Preparation of a CCNT:
   - 1 g of an MWCNT (diameter: 30 nm to 50 nm, commercially available) was added to 200 ml of a mixed acid (including concentrated sulfuric acid with a mass fraction of 98% and concentrated nitric acid with a mass fraction of 65% that were in a volume ratio of 3:1), and a resulting mixture was subjected to ultrasonic dispersion at 80° C. for 6 h and then to suction filtration; and a resulting solid product was washed until a pH was 7 and then dried to obtain the CCNT.

2) Preparation of a Silica Film-Coated Nano-Alumina Microsphere $Al_2O_3@SiO_2$:
   - 1 g of nano-alumina ($\alpha$-$Al_2O_3$, commercially available) was added to 300 mL of a mixed solution of ethanol and deionized water (which were in a volume ratio of 1:1), and a resulting mixture was subjected to ultrasonic dispersion for 30 min; 70 mL of 2 mol/L ammonia water was added, and a resulting mixture was thoroughly stirred; under continuous stirring, a solution of TEOS in ethanol (including 12 mL of TEOS and 70 mL of ethanol) was added dropwise; and a resulting system was centrifuged, and a resulting solid product was washed with deionized water and then dried to obtain $Al_2O_3@SiO_2$,
   where the nano-alumina included a coarse particle and a fine particle, and a mass ratio of the coarse particle to the fine particle was 2:1; and the coarse particle had a diameter of 500 nm to 550 nm and the fine particle had a diameter of 150 nm to 200 nm.

3) Preparation of Aminated $Al_2O_3@SiO_2$:
   The $Al_2O_3@SiO_2$ obtained in step 2) was added to 100 mL of ethanol, and a resulting mixture was subjected to ultrasonic dispersion for 20 min; APTS was added, and a resulting mixture was stirred at 55° C. for 8 h; and ethanol was removed through evaporation to obtain the aminated $Al_2O_3@SiO_2$, where a mass ratio of the APTS to the $Al_2O_3@SiO_2$ was 8:100.

4) Preparation of a Modified CNT/Nano-Alumina Microsphere Composite CNT-$Al_2O_3@SiO_2$:
   - 0.5 g of the CCNT obtained in step 1) and 0.25 g of the aminated $Al_2O_3@SiO_2$ obtained in step 3) were added to 100 mL of deionized water, a resulting mixture was subjected to an ultrasonic treatment for 45 min and then to suction filtration, and a resulting solid product was vacuum-dried at 80° C. to obtain CNT-$Al_2O_3@SiO_2$.

5) Preparation of the Composite Modified Particle PMMA-CNT-$Al_2O_3@SiO_2$ Through In-Situ Grafting of a Polymer on a Modified CNT:
   - 0.2 g of APS, 0.4 g of CTAB, and 0.8 g of the CNT-$Al_2O_3@SiO_2$ obtained in step 4) were added to 50 mL of deionized water, then 20 g of MMA was added, and a resulting mixture was thoroughly stirred, subjected to a reaction at 75° C. to 90° C. for 30 min to 90 min, heated to 100° C. to 120° C., and subjected to a reaction for 4 h to 12 h; and a resulting reaction system was centrifuged, and a resulting solid product was dried to obtain the composite modified particle PMMA-CNT-$Al_2O_3@SiO_2$.

S2-2: In parts by weight, 90 parts of PU, 16 parts of the composite modified particle, 12 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm.

Example 4

An eco-friendly long-lasting heat-sensitive paper was provided, including a substrate layer, a base color layer, a heat-sensitive covering layer, and a protective layer that were arranged sequentially from bottom to top.

The heat-sensitive paper was prepared by the following process:

A. A base color layer raw material was coated on a surface of the substrate layer, and a resulting product was oven-dried to obtain the base color layer, where the base color layer had a thickness of 2 μm to 3 μm; and the base color layer raw material was a mixture of an acrylic resin and a black pigment, and a mass ratio of the acrylic resin to the black pigment was 1:0.4.

B. A heat-sensitive covering layer raw material was coated on a surface of the base color layer, and a resulting product was oven-dried to obtain the heat-sensitive covering layer, where the heat-sensitive covering layer had a thickness of 3 μm to 7 μm; and the heat-sensitive covering layer raw material was an emulsion obtained by mixing an acrylic hollow microsphere with an acrylic resin, and a mass ratio of the acrylic hollow microsphere to the acrylic resin in the emulsion was 3:1.

C. A protective layer raw material was coated on a surface of the heat-sensitive covering layer, and a resulting product was oven-dried to obtain the protective layer, where the protective layer had a thickness of 2 μm to 3 μm; and the protective layer raw material was a mixture of PU, water-washed kaolin, and zinc stearate.

The coating in the above steps referred to reverse coating with an anilox roller; and the substrate layer was a heat-sensitive base paper.

In this example, the heat-sensitive covering layer raw material was prepared by the following process:

S1-1: Preparation of the acrylic hollow microsphere:

S1-1-1: In parts by weight, 16 parts of sodium 2-ethyl-hexyl sulfate, 24 parts of magnesium nitrate, and 10 parts of SDS were added to 500 parts of deionized water to obtain a precursor dispersion, 50 parts of a sodium hydroxide aqueous solution were added dropwise to the precursor dispersion under continuous stirring, and a resulting mixture was continuously stirred for 30 min to obtain a dispersion as an aqueous phase.

The generated magnesium hydroxide particles could be effectively adsorbed as a dispersing agent on surfaces of monomer droplets to stabilize the monomer droplets, thereby facilitating the dispersion of monomer droplets; and the SDS could effectively stabilize the magnesium hydroxide particles to avoid agglomeration of the magnesium hydroxide particles.

S1-1-2: In parts by weight, 100 parts of a monomer were mixed with 6 parts of a regulating agent A, then 4 parts of dibenzoyl peroxide, 4 parts of a regulating agent B, and 48 parts of a foaming agent were added, and a resulting mixture was thoroughly mixed to obtain an oil phase, where the monomer was a mixture of MMA, EMA, MAA, an acrylamide, and styrene, and in the monomer, a mass fraction of the EMA was 24%, a mass fraction of the MAA was 19%, a mass fraction of the acrylamide was 15%, a mass fraction of the styrene was 7%, and the MMA accounted for the balance;

the foaming agent was a mixture of isooctane and n-hexane, and a mass ratio of the isooctane to the n-hexane was 2:1;

the regulating agent A was DPGDA; and the regulating agent B was 2,2'-methylene-bis(4,6-di-tert-butylphenyl phosphate)basic aluminum.

S1-1-3: The aqueous phase and the oil phase were mixed and stirred at a high rotational speed of 8,000 rpm to obtain a mixture, the mixture was transferred to a reactor, subjected to a reaction at 10 kPa and 50° C. for 20 h, cooled, and filtered, and a resulting solid product was washed and dried to obtain the acrylic hollow microsphere.

S1-2: Preparation of the heat-sensitive covering layer raw material:

With a mass ratio of the acrylic hollow microsphere to an acrylic resin being 3:1, the acrylic hollow microsphere was added to an emulsion of the acrylic resin, and a resulting mixture was thoroughly stirred to obtain an emulsion formed by the acrylic hollow microsphere and the host resin, which was the heat-sensitive covering layer raw material.

In this example, the protective layer raw material was prepared by the following process:

S2-1: Preparation of a composite modified particle:

1) Preparation of a CCNT:
   1 g of an MWCNT (diameter: 30 nm to 50 nm, commercially available) was added to 200 mL of a mixed acid (including concentrated sulfuric acid with a mass fraction of 98% and concentrated nitric acid with a mass fraction of 65% that were in a volume ratio of 3:1), and a resulting mixture was subjected to ultrasonic dispersion at 80° C. for 6 h and then to suction filtration; and a resulting solid product was washed until a pH was 7 and then dried to obtain the CCNT.

2) Preparation of a Silica Film-Coated Nano-Alumina Microsphere $Al_2O_3@SiO_2$:
   1 g of nano-alumina ($\alpha$-$Al_2O_3$, commercially available) was added to 300 mL of a mixed solution of ethanol and deionized water (which were in a volume ratio of 1:1), and a resulting mixture was subjected to ultrasonic dispersion for 30 min; 70 mL of 2 mol/L ammonia water was added, and a resulting mixture was thoroughly stirred; under continuous stirring, a solution of TEOS in ethanol (including 12 mL of TEOS and 70 mL of ethanol) was added dropwise; and a resulting system was centrifuged, and a resulting solid product was washed with deionized water and then dried to obtain $Al_2O_3@SiO_2$,
   where the nano-alumina included a coarse particle and a fine particle, and a mass ratio of the coarse particle to the fine particle was 2:1; and the coarse particle had a diameter of 500 nm to 550 nm and the fine particle had a diameter of 150 nm to 200 nm.

3) Preparation of Aminated $Al_2O_3@SiO_2$:
   The $Al_2O_3@SiO_2$ obtained in step 2) was added to 100 mL of ethanol, and a resulting mixture was subjected to ultrasonic dispersion for 20 min; APTS was added, and a resulting mixture was stirred at 55° C. for 8 h; and ethanol was removed through evaporation to obtain the aminated $Al_2O_3@SiO_2$, where a mass ratio of the APTS to the $Al_2O_3@SiO_2$ was 8:100.

4) Preparation of a Modified CNT/Nano-Alumina Microsphere Composite CNT-$Al_2O_3@SiO_2$:
   0.5 g of the CCNT obtained in step 1) and 0.25 g of the aminated $Al_2O_3@SiO_2$ obtained in step 3) were added to 100 mL of deionized water, a resulting mixture was subjected to an ultrasonic treatment for 45 min and then to suction filtration, and a resulting solid product was vacuum-dried at 80° C. to obtain CNT-$Al_2O_3@SiO_2$.

5) Preparation of the Composite Modified Particle PMMA-CNT-$Al_2O_3@SiO_2$ Through In-Situ Grafting of a Polymer on a Modified CNT:
   0.2 g of APS, 0.4 g of CTAB, and 0.8 g of the CNT-$Al_2O_3@SiO_2$ obtained in step 4) were added to 50 mL of deionized water, then 20 g of MMA was added, and a resulting mixture was thoroughly stirred, subjected to a reaction at 75° C. to 90° C. for 30 min to 90 min, heated to 100° C. to 120° C., and subjected to a reaction for 4 h to 12 h; and a resulting reaction system was centrifuged, and a resulting solid product was dried to obtain the composite modified particle PMMA-CNT-$Al_2O_3@SiO_2$.

S2-2: In parts by weight, 90 parts of PU, 18 parts of the composite modified particle, 12 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm.

Comparative Example 1

This comparative example was basically the same as Example 3, except that the protective layer raw material in this comparative example included: 90 parts of PVC, 14 parts of water-washed kaolin, and 5 parts of zinc stearate.

Comparative Example 2

This comparative example was basically the same as Example 3, except that the protective layer raw material in this comparative example was prepared by the following process:
S2-1: Preparation of a composite modified particle:
1) Preparation of a CCNT:
   1 g of an MWCNT (diameter: 30 nm to 50 nm, commercially available) was added to 200 mL of a mixed acid (including concentrated sulfuric acid with a mass fraction of 98% and concentrated nitric acid with a mass fraction of 65% that were in a volume ratio of 3:1), and a resulting mixture was subjected to ultrasonic dispersion at 80° C. for 6 h and then to suction filtration; and a resulting solid product was washed until a pH was 7 and then dried to obtain the CCNT.
2) Preparation of a Silica Film-Coated Nano-Alumina Microsphere $Al_2O_3@SiO_2$:
   1 g of nano-alumina ($\alpha$-$Al_2O_3$, commercially available) was added to 300 mL of a mixed solution of ethanol and deionized water (which were in a volume ratio of 1:1), and a resulting mixture was subjected to ultrasonic dispersion for 30 min; 70 mL of 2 mol/L ammonia water was added, and a resulting mixture was thoroughly stirred; under continuous stirring, a solution of TEOS in ethanol (including 12 mL of TEOS and 70 mL of ethanol) was added dropwise; and a resulting system was centrifuged, and a resulting solid product was washed with deionized water and then dried to obtain $Al_2O_3@SiO_2$,
   where the nano-alumina included a coarse particle and a fine particle, and a mass ratio of the coarse particle to the fine particle was 2:1; and the coarse particle had a diameter of 500 nm to 550 nm and the fine particle had a diameter of 150 nm to 200 nm.
3) Preparation of Aminated $Al_2O_3@SiO_2$:
   The $Al_2O_3@SiO_2$ obtained in step 2) was added to 100 mL of ethanol, and a resulting mixture was subjected to ultrasonic dispersion for 20 min; APTS was added, and a resulting mixture was stirred at 55° C. for 8 h; and ethanol was removed through evaporation to obtain the aminated $Al_2O_3@SiO_2$, where a mass ratio of the APTS to the $Al_2O_3@SiO_2$ was 8:100.
4) Preparation of a Modified CNT/Nano-Alumina Microsphere Composite $CNT-Al_2O_3@SiO_2$:
   0.5 g of the CCNT obtained in step 1) and 0.25 g of the aminated $Al_2O_3@SiO_2$ obtained in step 3) were added to 100 mL of deionized water, a resulting mixture was subjected to an ultrasonic treatment for 45 min and then to suction filtration, and a resulting solid product was vacuum-dried at 80° C. to obtain $CNT-Al_2O_3@SiO_2$, which would serve as the composite modified particle.
S2-2: In parts by weight, 90 parts of PU, 16 parts of the composite modified particle, 12 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm.

Comparative Example 3

This comparative example was basically the same as Example 3, except that the protective layer raw material in this comparative example was prepared by the following process:
S2-1: Preparation of a composite modified particle:
1) Preparation of a CCNT:
   1 g of an MWCNT (diameter: 30 nm to 50 nm, commercially available) was added to 200 mL of a mixed acid (including concentrated sulfuric acid with a mass fraction of 98% and concentrated nitric acid with a mass fraction of 65% that were in a volume ratio of 3:1), and a resulting mixture was subjected to ultrasonic dispersion at 80° C. for 6 h and then to suction filtration; and a resulting solid product was washed until a pH was 7 and then dried to obtain the CCNT.
2) Preparation of an Aminated Nano-Alumina Microsphere:
   1 g of nano-alumina ($\alpha$-$Al_2O_3$, commercially available) was added to 100 mL of ethanol, and a resulting mixture was subjected to ultrasonic dispersion for 20 min; APTS was added, and a resulting mixture was stirred at 55° C. for 8 h; and ethanol was removed through evaporation to obtain the aminated $Al_2O_3$,
   where the nano-alumina included a coarse particle and a fine particle, and a mass ratio of the coarse particle to the fine particle was 2:1; the coarse particle had a diameter of 500 nm to 550 nm and the fine particle had a diameter of 150 nm to 200 nm; and
   a mass ratio of the APTS to the $Al_2O_3@SiO_2$ was 8:100.
3) Preparation of a Modified CNT/Nano-Alumina Microsphere Composite $CNT-Al_2O_3$:
   0.5 g of the CCNT obtained in step 1) and 0.25 g of the aminated $Al_2O_3$ obtained in step 2) were added to 100 mL of deionized water, a resulting mixture was subjected to an ultrasonic treatment for 45 min and then to suction filtration, and a resulting solid product was vacuum-dried at 80° C. to obtain the $CNT-Al_2O_3$.
4) Preparation of the Composite Modified Particle $PMMA-CNT-Al_2O_3$ Through In-Situ Grafting of a Polymer on a Modified CNT:
   0.2 g of APS, 0.4 g of CTAB, and 0.8 g of the $CNT-Al_2O_3$ obtained in step 4) were added to 50 mL of deionized water, then 20 g of MMA was added, and a resulting mixture was thoroughly stirred, subjected to a reaction at 75° C. to 90° C. for 30 min to 90 min, heated to 100° C. to 120° C., and subjected to a reaction for 4 h to 12 h; and a resulting reaction system was centrifuged, and a resulting solid product was dried to obtain the composite modified particle $PMMA-CNT-Al_2O_3$.
S2-2: In parts by weight, 90 parts of PU, 16 parts of the composite modified particle, 12 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm.

Comparative Example 4

This comparative example was basically the same as Example 3, except that the protective layer raw material in this comparative example was prepared by the following process:
In parts by weight, 90 parts of PU, 10 parts of MWCNT, 6 parts of nano-alumina, 12 parts of water-washed kaolin, and 5 parts of zinc stearate were added to a reactor, and heated and blended to obtain the protective layer raw material, where the blending was conducted for 1 h at a temperature of 80° C. and a rotational speed of 45 rpm; the nano-alumina included a coarse particle and a fine particle, and a mass ratio of the coarse particle to the fine particle was 2:1; and the coarse particle had a diameter of 500 nm to 550 nm and the fine particle had a diameter of 150 nm to 200 nm.

Performance Tests:

1. The heat-sensitive papers prepared in Examples 1 to 4 and Comparative Examples 1 to 4 each were tested for dynamic color-developing sensitivity, and test results were shown in Table 1 below:

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Dynamic color-developing sensitivity (mJ/mm$^2$) | 8 | 4 | 4 | 3 | 9 | 6 | 7 | 8 |

The dynamic color-developing sensitivity was tested in accordance with the "GB/T28210-2011 *Heat-Sensitive Paper Performance Test Standard*". The lower the energy level of color-developing sensitivity, the better the dynamic color-developing sensitivity. It can be seen from the results in Table 1 that the heat-sensitive papers prepared in Examples 2 to 4 have excellent color-developing sensitivity; and the color-developing sensitivity of each of the heat-sensitive papers prepared in Comparative Examples 1 to 4 is greatly reduced, which is mainly attributed to the following reason: the MWCNT and nano-alumina cannot give full play to their effect of enhancing thermal conduction performance, such that the protective layers prepared in Comparative Examples 1 to 4 have poor thermal conduction performance, and the heat at a head of a heat-sensitive printer cannot quickly and fully act on the heat-sensitive covering layer.

2. In order to further illustrate the present application, the protective layers prepared in Examples 1 to 4 and Comparative Examples 1 to 4 each were subjected to the following performance tests: the protective layer raw material prepared in each example was prepared into a sample as required, and then the sample was subjected to thermal conductivity and scratch resistance tests. Test results were shown in Table 2 below.

The thermal conductivity was tested in accordance with "ASTM D5470-2012 *Standard Test Methods for Heat Transfer Characteristics of Thermally-Conductive Electrical-Insulating Materials.*"

A test method for scratch resistance was as follows: An electric scratch tester 430P (German ERICHSEN) was used to conduct a scratch resistance test. According to the provisions of GME60280, a scratch needle with a needle head diameter of 1 mm was used to scratch a line segment pattern on a surface of the prepared sample, where a test load was 5 N, a speed was 1 m/min, and each needle head scratched only once in a direction. A color deviation ΔL of a scratched surface from an unscratched surface was measured by a colorimeter, with a D65 light source as a lighting source.

It can be seen from the results in Table 2 that the protective layer formed by the protective layer raw material in each of Examples 2 to 4 has excellent thermal conductivity and scratch resistance; because the composite modified particle is not added in Example 1 and Comparative Example 1, the thermal conductivity and scratch resistance are significantly reduced; because the composite modified particle is not grafted with a polymer in Comparative Example 2, the composite modified particle is difficult to be fully dispersed in the organic system, such that the CNT and the nano-alumina microsphere cannot effectively play their roles, resulting in poor thermal conductivity and scratch resistance; because silica is not coated in Comparative Example 3, the compatibility of the composite modified particle with the PU matrix is reduced, and the thermal conductivity and scratch resistance are also poor; and because the addition of the CNT and the nano-alumina microsphere is not achieved through the structural system of the composite CNT-Al$_2$O$_3$@SiO$_2$ in Comparative Example 4, the modified CNT and the nano-alumina microsphere are difficult to be uniformly dispersed in the organic system, which also significantly reduces the thermal conductivity and scratch resistance.

3. The acrylic hollow microspheres prepared in Examples 1 to 4 each were tested for foaming performance as follows: A plurality of samples were taken from the acrylic hollow microsphere prepared in each example, placed on glass slides, and heated on a heating stage of a thermostatic controller; and then an eye relief of a microscope was adjusted to observe a foaming process of a thermally-expanding microsphere on a glass slide, a foaming-starting temperature $T_0$, a maximum foaming temperature $T_{max}$ (namely, a temperature at the start of rupturing), an initial microsphere diameter $D_0$, and a maximum expansion diameter $D_{max}$ (namely, a diameter at the start of rupturing) were recorded, and a maximum thermal expansion rate $\eta=(D_{max}/D_0)^3$ was calculated. Test results were shown in Table 3.

TABLE 3

|  | Example 1 | Example 2 | Example 3 | Example 4 |
|---|---|---|---|---|
| $T_0$ (° C.) | 125 | 128 | 127 | 124 |
| $T_{max}$ (° C.) | 195 | 197 | 198 | 197 |

TABLE 2

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Thermal conductivity, W/(Mk) | 0.21 | 2.7 | 2.9 | 3.0 | 0.16 | 1.18 | 1.06 | 0.87 |
| Scratch resistance ΔL | 1.4 | 0.37 | 0.32 | 0.30 | 1.3 | 0.81 | 0.85 | 0.93 |

TABLE 3-continued

|  | Example 1 | Example 2 | Example 3 | Example 4 |
|---|---|---|---|---|
| Maximum thermal expansion rate | 1.62 | 1.64 | 1.71 | 1.92 |

It can be seen from Table 3 that the acrylic hollow microspheres in Examples 1 to 4 each have a rupture temperature of about 200° C., which can match a working temperature of a head of a general heat-sensitive printer (about 190° C. to 220° C.); and the acrylic hollow microspheres each have a maximum thermal expansion rate of about 1.5 to 2.0, and thus can quickly rupture under heating of a head of a heat-sensitive printer. It can be seen from the results of Examples 2 to 4 that, with the increase in the mass ratio of the regulating agent A (DPGDA) to the regulating agent B (2,2'-methylene-bis(4,6-di-tert-butylphenyl phosphate)basic aluminum), the maximum thermal expansion rate of the acrylic hollow microsphere tends to increase.

The embodiments of the present application have been disclosed above, which are not limited to the applications listed in the specification and implementations and can be absolutely applied to various fields suitable for the present application. Additional modifications can be easily made by those skilled in the art. Therefore, without departing from the general concepts defined by the claims and equivalent scopes thereof, the present application is not limited to specific details.

What is claimed is:

1. An eco-friendly long-lasting heat-sensitive paper, comprising a substrate layer, a base color layer, a heat-sensitive covering layer, and a protective layer that are arranged sequentially from bottom to top,
wherein the heat-sensitive covering layer is prepared as follows: coating a heat-sensitive covering layer raw material on the base color layer, and oven-drying a resulting product, wherein the heat-sensitive covering layer raw material is an emulsion obtained by mixing an acrylic hollow microsphere with a host resin, and a mass ratio of the acrylic hollow microsphere to the host resin in the emulsion is 3:2 to 5:1; wherein the heat-sensitive covering layer raw material is prepared by the following process:
S1-1: preparation of the acrylic hollow microsphere:
S1-1-1: in parts by weight, adding 8 to 24 parts of sodium 2-ethylhexyl sulfate, 15 to 40 parts of magnesium nitrate, and 5 to 15 parts of sodium dodecyl sulfate (SDS) to 400 to 600 parts of deionized water to obtain a precursor dispersion, adding 30 to 60 parts of a sodium hydroxide aqueous solution dropwise to the precursor dispersion under continuous stirring, and continuously stirring a resulting mixture for 20 min to 60 min to obtain a dispersion as an aqueous phase;
S1-1-2: in parts by weight, mixing 100 parts of a monomer with a regulating agent A, adding 2 to 8 parts of dibenzoyl peroxide, a regulating agent B, and 40 to 60 parts of a foaming agent, and thoroughly mixing a resulting mixture to obtain an oil phase,
wherein the monomer is a mixture of methyl methacrylate (MMA), ethyl methacrylate (EMA), methacrylic acid (MAA), an acrylamide, and styrene, and in the monomer, a mass fraction of the EMA is 22% to 34%, a mass fraction of the MAA is 18% to 30%, a mass fraction of the acrylamide is 12% to 24%, a mass fraction of the styrene is 5% to 10%, and the MMA accounts for the balance;
the foaming agent is a mixture of isooctane and n-hexane, and a mass ratio of the isooctane to the n-hexane is 2:1;
the regulating agent A is dipropylene glycol diacrylate (DPGDA); the regulating agent B is one or a mixture of two or more selected from the group consisting of 2,2'-methylene-bis(4,6-di-tert-butylphenyl phosphate) basic aluminum, sodium 2,2'-methylenebis(4,6-di-tert-butylphenyl)phosphate, and bis(4-tert-butyl-benzoate) aluminum hydroxide; and a mass ratio of the regulating agent A to the regulating agent B is 3:2 to 5:1; and
S1-1-3: mixing the aqueous phase and the oil phase, stirring a resulting mixed phase at 4,000 rpm to 10,000 rpm to obtain a mixture, and transferring the mixture to a reactor; and subjecting the mixture to a reaction at 8 kPa to 15 kPa and 45° C. to 65° C. for 16 h to 30 h, cooling and filtering a resulting reaction system, and washing and drying a resulting solid product to obtain the acrylic hollow microsphere; and
S1-2: preparation of the heat-sensitive covering layer raw material:
with a mass ratio of the acrylic hollow microsphere to the host resin being 3:2 to 5:1, adding the acrylic hollow microsphere to an emulsion of the host resin, and thoroughly stirring a resulting mixture to obtain an emulsion formed by the acrylic hollow microsphere and the host resin, which is the heat-sensitive covering layer raw material.

2. The eco-friendly long-lasting heat-sensitive paper according to claim 1, wherein the heat-sensitive paper is prepared by the following process:
A. coating a base color layer raw material on a surface of the substrate layer, and oven-drying a resulting product to obtain the base color layer, wherein the base color layer has a thickness of 2 μm to 3 μm;
B. coating the emulsion obtained by mixing the acrylic hollow microsphere with the host resin on the surface of the base color layer, and oven-drying a resulting product to obtain the heat-sensitive covering layer, wherein the heat-sensitive covering layer has a thickness of 3 μm to 7 μm; and
C. coating a protective layer raw material on a surface of the heat-sensitive covering layer, and oven-drying a resulting product to obtain the protective layer, wherein the protective layer has a thickness of 2 μm to 3 μm.

3. The eco-friendly long-lasting heat-sensitive paper according to claim 2, wherein the substrate layer is selected from the group consisting of a biaxially oriented polypropylene (BOPP) synthetic paper, a white polyethylene (PE) film, a two-sided offset paper, a plastic-coated paper, and a heat-sensitive base paper.

4. The eco-friendly long-lasting heat-sensitive paper according to claim 2, wherein the base color layer raw material is a mixture of an acrylic resin and a pigment, and a mass ratio of the acrylic resin to the pigment is 1:0.2 to 1:0.8.

5. The eco-friendly long-lasting heat-sensitive paper according to claim 2, wherein the protective layer raw material is a mixture of modified polyurethane (PU), water-washed kaolin, and zinc stearate.

6. The eco-friendly long-lasting heat-sensitive paper according to claim 5, wherein the protective layer raw material is prepared by the following process:
S2-1: preparation of a composite modified particle; and
S2-2: in parts by weight, adding 80 to 100 parts of the PU, 8 to 26 parts of the composite modified particle, 10 to 20 parts of the water-washed kaolin, and 2 to 8 parts of the zinc stearate to a reactor, and heating and blending a resulting mixture to obtain the protective layer raw material, wherein the blending is conducted for 0.5 h to 2 h at a temperature of 50° C. to 80° C. and a rotational speed of 30 rpm to 100 rpm.

7. The eco-friendly long-lasting heat-sensitive paper according to claim 6, wherein the composite modified particle in S2-1 is prepared by the following process:
1) Preparation of a carboxylated carbon nanotube (CCNT):

adding a carbon nanotube (CNT) to a mixed acid of concentrated sulfuric acid with a mass fraction of 98% and concentrated nitric acid with a mass fraction of 65%, and subjecting a resulting mixture to ultrasonic dispersion at 75° C. to 110° C. for 2 h to 8 h and then to suction filtration; and washing a resulting solid product until a pH is 7, and drying a washed solid product to obtain the CCNT;

2) Preparation of a silica film-coated nano-alumina microsphere $Al_2O_3@SiO_2$:

adding nano-alumina to a mixed solution of ethanol and deionized water, and subjecting a resulting mixture to ultrasonic dispersion; adding ammonia water, and thoroughly stirring a resulting mixture; under continuous stirring, adding a solution of tetraethyl orthosilicate (TEOS) in ethanol dropwise; and centrifuging a resulting system, washing a resulting solid product with deionized water, and drying a washed solid product to obtain $Al_2O_3@SiO_2$, wherein the nano-alumina comprises a coarse particle and a fine particle, and a mass ratio of the coarse particle to the fine particle is 2:1; and the coarse particle has a diameter of 500 nm to 550 nm and the fine particle has a diameter of 150 nm to 200 nm;

3) Preparation of aminated $Al_2O_3@SiO_2$:

adding the $Al_2O_3@SiO_2$ obtained in step 2) to ethanol, and subjecting a resulting mixture to ultrasonic dispersion for 10 min to 40 min; adding aminopropyltriethoxysilane (APTS), and stirring a resulting mixture at 45° C. to 65° C. for 4 h to 10 h; and removing ethanol through evaporation to obtain the aminated $Al_2O_3@SiO_2$, wherein a mass ratio of the APTS to the $Al_2O_3@SiO_2$ is 4:100 to 15:100;

4) Preparation of a modified CNT/nano-alumina microsphere composite CNT-$Al_2O_3@SiO_2$:

adding the CCNT obtained in step 1) and the aminated $Al_2O_3@SiO_2$ obtained in step 3) to deionized water, subjecting a resulting mixture to an ultrasonic treatment for 15 min to 90 min and then to suction filtration, and vacuum-drying a resulting solid product at 70° C. to 90° C. to obtain CNT-$Al_2O_3@SiO_2$, wherein a mass ratio of the CCNT to the aminated $Al_2O_3@SiO_2$ is 4:1 to 1.5:1; and 5) Preparation of the composite modified particle PMMA-CNT-$Al_2O_3@SiO_2$ through in-situ grafting of a polymer on a modified CNT:

adding ammonium persulfate (APS), cetyl trimethyl ammonium bromide (CTAB), and the CNT-$Al_2O_3@SiO_2$ obtained in step 4) to deionized water, adding MMA, thoroughly stirring a resulting mixture, and conducting a reaction at 75° C. to 90° C. for 30 min to 90 min; heating a resulting reaction system to 100° C. to 120° C., and conducting a reaction for 4 h to 12 h; and centrifuging a resulting reaction system, and drying a resulting solid product to obtain the composite modified particle PMMA-CNT-$Al_2O_3@SiO_2$, wherein a mass ratio of the CNT-$Al_2O_3@SiO_2$ to the MMA is 1:100 to 8:100.

8. The eco-friendly long-lasting heat-sensitive paper according to claim 2, wherein the host resin is selected from the group consisting of an acrylic resin, a carboxylated styrene butadiene resin, and a PU resin.

9. The eco-friendly long-lasting heat-sensitive paper according to claim 8, wherein the host resin is the acrylic resin, and a mass ratio of the acrylic hollow microsphere to the host resin in the emulsion is 3:1.

* * * * *